Sept. 13, 1949.  W. SCHADE ET AL  2,481,688
LARGE APERTURE OBJECTIVE HAVING
FOUR AIR SPACED COMPONENTS
Filed Feb. 9, 1946
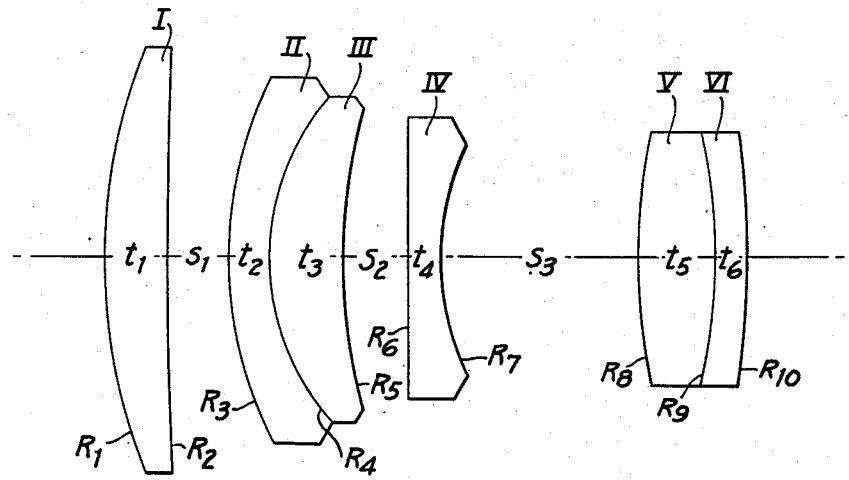
| EF = 100 mm. | | | | | f/2.0 | |
|---|---|---|---|---|---|---|
| LENS | $N_D$ | V | RADII | | THICKNESSES | |
| I | 1.611 | 58.8 | $R_1$ = + 68.3 mm. | | $t_1$ | = 8.0 mm. |
|  |  |  | $R_2$ = +589. | | $s_1$ | = 7.5 |
| II | 1.617 | 36.6 | $R_3$ = + 48.9 | | $t_2$ | = 5.0 |
| III | 1.697 | 56.1 | $R_4$ = + 30.0 | | $t_3$ | = 9.0 |
|  |  |  | $R_5$ = + 68.5 | | $s_2$ | = 8.1 |
| IV | 1.689 | 30.9 | $R_6$ = ∞ | | $t_4$ | = 3.8 |
|  |  |  | $R_7$ = + 30.8 | | $s_3$ | = 24.3 |
| V | 1.697 | 56.1 | $R_8$ = + 75.5 | | $t_5$ | = 10.0 |
| VI | 1.523 | 58.6 | $R_9$ = − 60.0 | | $t_6$ | = 4.0 |
|  |  |  | $R_{10}$= −114.0 | | BF | = 48.9 |
WILLY SCHADE
WESLEY VAN GRAAFEILAND
INVENTORS Patented Sept. 13, 1949

2,481,688

UNITED STATES PATENT OFFICE 2,481,688

LARGE APERTURE OBJECTIVE HAVING FOUR AIR SPACED COMPONENTS

Willy Schade and Wesley Van Graafeiland, Rochester, N. Y., assignors to Eastman Kodak Company, Rochester, N. Y., a corporation of New Jersey Application February 9, 1946, Serial No. 646,686

5 Claims. (Cl. 88—57)

This invention relates to large-aperture objectives for photography and projection.

An object of the invention is to provide a high-aperture optical objective particularly suitable for projection purposes, consisting of two single elements and two doublets, and more highly corrected for axial and oblique spherical aberration than objectives of equal complexity heretofore available, and also corrected for curvature of field and astigmatism.

A well known type of photographic objective consists of two positive components at least one of which is a meniscus followed by a negative component and another positive component in that order. All four components may be simple or some may be compound.

A particularly favorable form of this type objective is described in U. S. Patent 2,336,300, to one of us (Schade) in which the second component is a meniscus doublet consisting of a negative element cemented to the front of a positive element of higher index and the fourth component is a doublet consisting of a biconvex element of higher index cemented to a negative element of lower index. The other two components are singlets.

According to the present invention, an objective of this form is made up in which the sum of the three airspaces is between 0.2 F and 0.5 F and the over-all length is between 0.65 F and 0.85 F, where F is the focal length of the objective, the index difference within the second component is between 0.04 and 0.10, and that within the rear component is between 0.12 and 0.30. By over-all length is meant the total axial thickness of the objective from the front to the rear surface.

According to a preferred feature of the invention the rear doublet is arranged with its more strongly curved bounding surface at the front and with the negative element behind the positive one.

According to another preferred feature of the invention, the negative component is so shaped that the radius of curvature of its front surface is more than 4.7 times that of its rear surface, and it is made up of a flint glass having a refractive index between 1.65 and 1.85.

It is advantageous to make the said positive elements of the second and fourth components of glass having a refractive index N between 1.65 and 1.90. For color correction the dispersive index V should be relatively high, depending somewhat upon the refractive index, and should be such that (V+100 N) is greater than 215.

Objectives according to the invention are much more economical to mount and convenient to handle than the Petzval type lenses heretofore commonly used as projection objectives on account of the short over-all length and back focal length, and as regards image quality they are fully equal and in many ways superior.

The accompanying drawing shows an objective according to a preferred form of the invention and constructional data for one example.

The constructional data is as follows:

[F=100 mm. Aperture=F/2.0]

| Lens | N | V | Radii | Thicknesses |
|---|---|---|---|---|
| I | 1.611 | 58.8 | $R_1 = + 68.3$ mm.<br>$R_2 = +589.$ | $t_1 = 8.0$ mm.<br>$s_1 = 7.5$ |
| II | 1.617 | 36.6 | $R_3 = + 48.9$ | $t_2 = 5.0$ |
| III | 1.697 | 56.1 | $R_4 = + 30.0$<br>$R_5 = + 68.5$ | $t_3 = 9.0$<br>$s_2 = 8.1$ |
| IV | 1.689 | 30.9 | $R_6 = \infty$<br>$R_7 = + 30.8$ | $t_4 = 3.8$<br>$s_3 = 24.3$ |
| V | 1.697 | 56.1 | $R_8 = + 75.5$ | $t_5 = 10.0$ |
| VI | 1.523 | 58.6 | $R_9 = - 60.0$<br>$R_{10} = -114.0$ | $t_6 = 4.0$<br>$BF = 48.9$ |

Another objective according to the invention has the following characteristics:

[F=100 mm.]

| Lens | N | V | Radii | Thicknesses |
|---|---|---|---|---|
| I | 1.611 | 58.8 | $R_1 = + 68.5$ mm.<br>$R_2 = +590.$ | $t_1 = 8.0$ mm.<br>$s_1 = 7.5$ |
| II | 1.649 | 33.8 | $R_3 = + 51.5$ | $t_2 = 5.0$ |
| III | 1.697 | 56.1 | $R_4 = + 30.1$<br>$R_5 = + 78.9$ | $t_3 = 9.0$<br>$s_2 = 8.1$ |
| IV | 1.621 | 36.2 | $R_6 = -140.9$<br>$R_7 = + 28.6$ | $t_4 = 3.7$<br>$s_3 = 13.9$ |
| V | 1.697 | 56.1 | $R_8 = + 87.8$ | $t_5 = 12.0$ |
| VI | 1.523 | 58.6 | $R_9 = - 27.4$<br>$R_{10} = -103.8$ | $t_6 = 4.0$<br>$BF = 56.5$ |

In these tables of data the lens elements are numbered in Roman numerals from the front to the rear, the index N for the D line of the spectrum and the dispersive index V are given in the second and third columns, and the radii R, thicknesses t, and spaces S, each numbered by subscripts from front to rear are given in the fourth and fifth columns. The + and − signs on the radii indicate surfaces convex or concave respectively to the front. The back focal length BF is also indicated.

Each of these examples embodies all the broad features of the invention and some or all the preferred features. Some of these are obvious from the above tables, and other are listed in the following chart:

| Broad or preferred features | Ex. 1 | Ex. 2 |
|---|---|---|
| $\frac{F}{5}<(S_1+S_2+S_3)<\frac{F}{2}$ | 0.40 F | 0.30 F |
| $.65\,F<O.L.<.85\,F$ | 0.80 F | 0.71 F |
| $.04<(N_{III}-N_{II})<.10$ | 0.080 | 0.048 |
| $.12<(N_V-N_{VI})<.30$ | 0.174 | 0.174 |
| $R_6>4.7\,R_7$ | ∞ | 4.9 $R_7$ |

In this chart $(S_1+S_2+S_3)$ indicates the sum of the three airspaces and O. L. the over all length. Also $N_{III}$ and $N_V$ are the refractive indices of the positive element and $N_{II}$ and $N_{VI}$ are those of the negative elements of the second and the fourth component respectively. Finally $R_6$ and $R_7$ are the radii of curvature of the front and rear surfaces of the negative component.

In both examples the third airspace is the largest, as is customary, and in the preferred example it is larger than the sum of the other two.

While superior results have been obtained by the particular structure of the second and fourth components in combination with simple elements being used as the first and third component, it is to be pointed out that compound components may be used in these positions also to obtain further refinement of the corrections without departing from the spirit of the invention.

What we claim is:

1. A photographic objective having its two principal points between its front and rear vertices and consisting of four components in axial alignment, of which components the front two are positive each with its front surface more strongly curved than its rear surface and at least one of the two being meniscus in shape, the third component is negative, and the fourth component is a biconvex doublet, the objective being characterized by the sum of its three airspaces being between 0.2 F and 0.5 F where F is the focal length of the objective, by its overall axial length being between 0.65 F and 0.85 F, by the second component being compound with its front element negative and cemented to a positive element whose refractive index is higher than that of the negative element by between 0.04 and 0.10, by the fourth component consisting of a negative element cemented to a biconvex element whose refractive index is higher than that of the negative element of the fourth component by between 0.12 and 0.30, and by the radii of curvature of the cemented surfaces between the said elements of the second and fourth components being less than 0.5 F and F respectively and both being greater than 0.2 F.

2. An objective according to claim 1 in which the cemented surface in the fourth component is concave toward the front.

3. An objective according to claim 1 in which the rear airspace is greater than either of the other two and in which the radii R and the refractive indices N, each numbered by subscripts in order from front to rear are within the following specified limits:

$$0.45\,F<+R_1<F$$
$$\pm R_2>2.5\,F$$
$$0.4\,F<+R_3<0.9\,F$$
$$0.5\,F<+R_5<1.6\,F$$
$$-R_6>F$$
$$0.2\,F<+R_7<0.4\,F$$
$$0.5\,F<+R_8<1.2\,F$$
$$0.2\,F<-R_9<F$$
$$R_8<-R_{10}<1.6\,F$$
$$1.58<N_1<1.7$$
$$1.58<N_2<1.7$$
$$1.65<N_3<1.8$$
$$1.65<N_5<1.8$$
$$1.65<N_4<1.8$$
$$1.50<N_6<(N_5-0.12)$$

where F is the focal length of the objective and the + and − signs designate surfaces respectively convex and concave to the front.

4. A photographic objective having its two principal points between its front and rear vertices and consisting of four components in axial alignment, of which components the front two are positive each with its front surface more strongly curved than its rear surface and at least one of the two being meniscus in shape, the third component is negative, and the fourth component is a biconvex doublet, the objective being characterized by its overall axial length being between 0.65 F and 0.85 F where F is the focal length of the objective, by the second component being compound with its front element negative and cemented to a positive element whose refractive index is higher than that of the negative element by between 0.04 and 0.10, by the fourth component consisting of a negative element cemented to a positive element whose refractive index is higher than that of the negative element of the fourth component by between 0.12 and 0.30, by the radii of curvature of the cemented surfaces between the said elements of the second and fourth components being less than 0.5 F and F respectively and both being greater than 0.2 F, and by the axial distance between the said two cemented surfaces being between 0.46 F and 0.56 F.

5. An objective according to claim 4 in which the cemented surface in the fourth component is concave toward the front.

WILLY SCHADE.
WESLEY VAN GRAAFEILAND.

REFERENCES CITED

The following references are of record in the file of this patent:

UNITED STATES PATENTS

| Number | Name | Date |
|---|---|---|
| 2,076,686 | Tronnier | Apr. 13, 1937 |
| 2,270,235 | Warmisham | Jan. 20, 1942 |
| 2,336,300 | Schade | Dec. 7, 1943 |

FOREIGN PATENTS

| Number | Country | Date |
|---|---|---|
| 428,825 | Germany | May 14, 1926 |
| 803,679 | France | July 15, 1936 |